United States Patent [19]
Tso

[11] Patent Number: 6,072,598
[45] Date of Patent: *Jun. 6, 2000

[54] METHOD FOR ENHANCING USABILITY OF FAX ON SMALL DEVICE

[75] Inventor: Michael Man-Hak Tso, Hillsboro, Oreg.

[73] Assignee: Intel Corporation, Santa Clara, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/936,158

[22] Filed: Sep. 24, 1997

Related U.S. Application Data

[63] Continuation of application No. 08/806,734, Feb. 27, 1996, abandoned.

[51] Int. Cl.[7] .................................................. H04N 1/00
[52] U.S. Cl. ........................................ 358/442; 358/443
[58] Field of Search .................................. 358/442–443, 358/405–406, 462–463, 448, 530

[56] References Cited

U.S. PATENT DOCUMENTS

| | | | |
|---|---|---|---|
| 4,180,798 | 12/1979 | Komori et al. | 340/146.3 H |
| 5,182,656 | 1/1993 | Chevion et al. | 358/452 |
| 5,231,663 | 7/1993 | Earl et al. | 380/18 |

*Primary Examiner*—Thomas D Lee
*Assistant Examiner*—Stephen Brinich
*Attorney, Agent, or Firm*—Blakely, Sokoloff, Taylor & Zafman LLP

[57] ABSTRACT

In a device with limited processor and/or memory capability, such as a Personal Digital Assistant or handheld computer, that has a viewscreen, a method and system for viewing a facsimile transmission image. After being sent, the facsimile transmission is routed to and intercepted by a computer system for processing before it reaches the device. The processing of the facsimile transmission includes recognizing text and outputting it, along with rendering information such as position, to a transmittal file. Once the recognizable text has been filtered from the facsimile transmission, the remaining images are edge-fit and output to the transmittal data file by position and other rendering information. The transmittal file is sent to the device with the viewscreen. The device then uses the information contained within the transmittal file to render a version of the facsimile transmission image and display it on the viewscreen.

15 Claims, 5 Drawing Sheets

6,072,598

METHOD FOR ENHANCING USABILITY OF FAX ON SMALL DEVICE

This is a Rule 1.62 continuation of application Ser. No. 08/606,734, filed Feb. 27, 1996, now abandoned.

BACKGROUND OF THE INVENTION

1. Field of the Invention

The present invention relates to the field of use of telecommunications. More particularly, the present invention relates to enhancing the usability of faxes and other image transmissions for display on small screens such as the display of a Personal Digital Assistant or handheld computer or other devices having a limited display and/or limited storage capacity.

2. Description of Related Art

Image and text data transmitted by fax machines are among the most widespread new uses of voice and data communications devices such as telephones. These faxed images are usually transmitted through the telephone and received for printout or storage of the image on a destination fax machine or computer for the use of the recipient. Since the destination machine has typically been a fax, computer, printer or other such large capacity storage and output device, there has not been a need to compress the fax significantly for the destination output device. Furthermore, scaling of the fax to fit small hand-held viewscreens has not been necessary since the traditional destination has been either a full size print-out, computer monitor or mass storage media.

With the ongoing development of devices such as Personal Digital Assistants (PDAs) having small graphical viewscreens, the display and handling schemes for fax images must be adapted to overcome the limitations of such devices if they are to adequately receive fax transmissions. Though equipped with graphical viewscreens, these PDAs, unlike their fax machine or computer counterparts, have extremely limited storage and video capabilities. For instance on a PDA, the typical storage space totals only one megabyte (1 MB), and this space would be quickly filled by just six pages of fax data which would total 900 Kilobytes (900 KB).

Devices such as PDAs or handheld computers have the ability to receive fax information even though they are used primarily to send out faxes. But using such a device, the recipient must scroll through portions of the faxed document image, or receive the fax in parts and is unable to receive several pages or multiple faxes at once due to storage limitations. Thus, there is an urgent need for compressing incoming fax transmissions before they are finally viewed by the recipient on the destination PDA and display. Further, since the screen size is small compared to normal displays and as compared with the fax, there is a need to efficiently scale the image to avoid the recipient having to scroll through the image once it is received.

Many techniques are known and have been developed to scale and compress images but these techniques are usually too compute intensive for a PDA which has no significant memory system nor microprocessor capability compared to a desktop computer. Further, these compression and scaling schemes have never been adapted to transmit a fax such that it be adequately displayed on a very small display screen like a PDA display screen. Rather, many of the techniques used rely on scaling and compressing the entire image pixel-by-pixel as a bitmap and do not optimize for a fax document which is largely text with some image data. Thus, there is required a system and method for compressing and scaling fax images for the specific purpose of efficiently receiving and displaying them on PDA display screens or other small device screens with limited microprocessor and storage capability.

SUMMARY

The present invention is a method and system for viewing a facsimile (hereinafter referred to as "fax") on a viewscreen of a limited storage/processing capability destination device such as Personal Digital Assistant (PDA) or handheld computer. When the fax is sent to the device, the call is transferred to a computer or other apparatus having significantly greater storage/processing capability compared to the destination device. The fax is processed in the computer system by decomposing the fax into recognizable text elements, and then outputting the text elements to a transmittal file. Along with the text elements themselves, rendering information such as position or color is provided, so that the text may be rendered more accurately at the destination device. Similarly, graphical elements are recognized and stored by their coordinates and other rendering information. The graphical elements are also edge-fitted so that curves and polygons are more efficiently represented. The graphical information is also output to the transmittal file.

The completed transmittal file, which can be further compressed, will therefore contain all the information necessary to reconstruct the fax at the destination device. The transmittal file is received by the destination device which then uses the information within the file to reconstruct an image of the fax on the viewscreen. The invention is advantageous in that the transmittal file is orders of magnitude smaller than the original fax itself and can be more easily and quickly scaled and viewed at a device with limited storage/processing capability such as a PDA.

DETAILED DESCRIPTION OF THE INVENTION

While the present invention has been particularly described with reference to the various figures, it should be understood that the figures are for illustration only and should not be taken as limiting the scope of the invention. Many changes and modifications may be made to the invention, by one having ordinary skill in the art, without departing from the spirit and scope of the invention.

Figure 1:
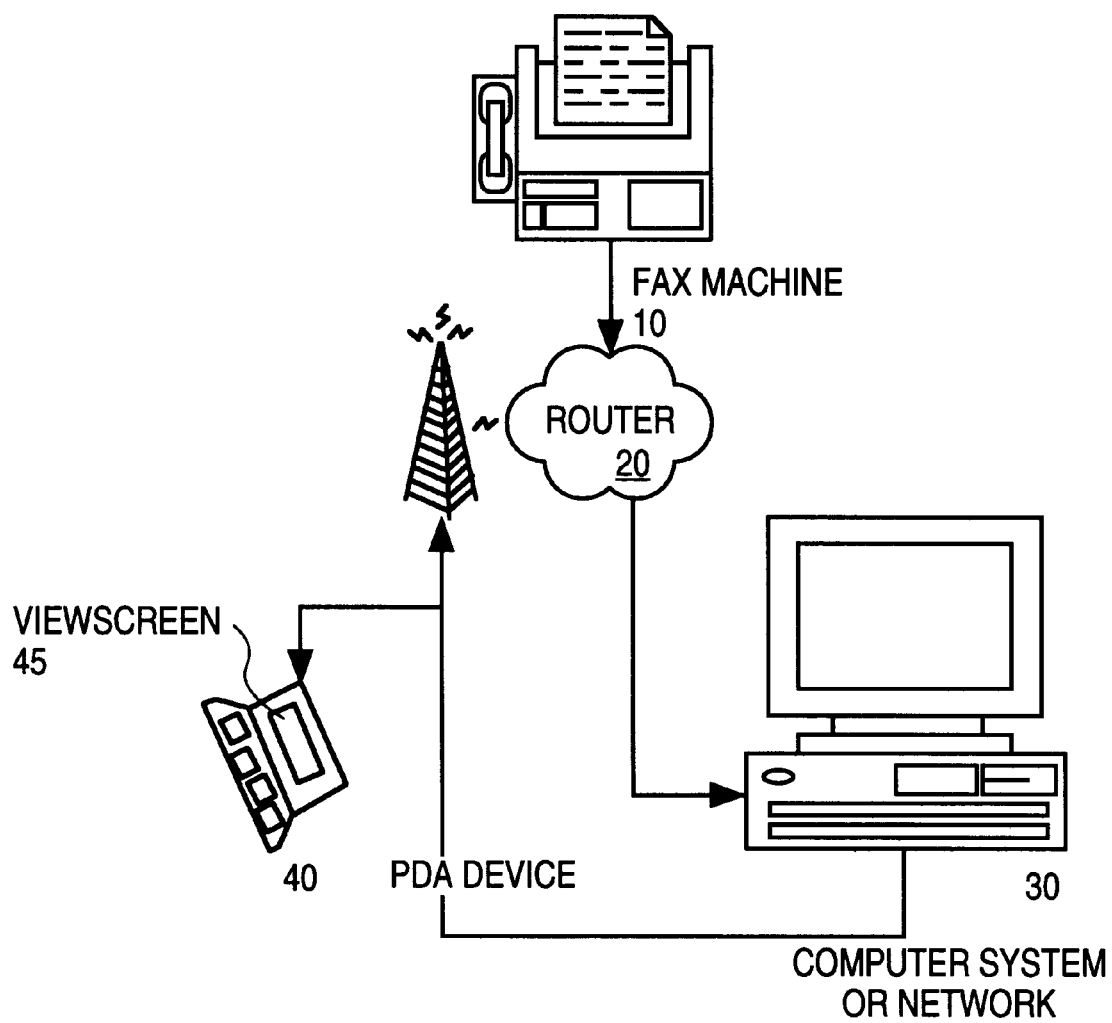
FIG. 1 is a routing diagram showing the data path of the fax.

FIG. 1 shows a pictorial routing diagram of the path the fax data travels before reaching a destination PDA device 40. An originating fax machine 10 (or other fax capable device) dials a phone number corresponding to the destination PDA device 40 in order to transmit the data to it for viewing by a recipient. A router 20, may be a cellular switch/PSTN (Public Switched Telephone Network) or other communications router such as ethernet, intercepts and re-routes the incoming fax call to a computer system 30, which may be single machine or a network of machines that can be located remotely away from the PDA device 40, for processing. Though described herein as implemented in a PDA device, the present invention may also be employed in a handheld computer.

The computer system 30 then can either store the entire fax in the computer system or process the fax as the packets of the transmission are being received and store a processed version of the fax. If the fax is received and stored, then the communications port of the computer system is freed for other tasks, perhaps to receive another incoming fax. The re-routing of the fax to the computer system 30 also prevents tying up the PDA device 40 so that it can receive all of its faxes at once if the recipient so chooses. The faxes may be collected and stored by the computer system 30 for later download. The computer can therefore, act as a server storing faxes and the user can select whether to receive the fax(es) immediately or wait. In either case, the fax is processed for display on a viewscreen 45 of the PDA device 40. However, alternatively, if the user chooses to, the fax, rather than being processed on the PDA device 40, can be sent to a real fax machine for output.

The computer system 30 outputs a processed version of the fax into a fax data transmittal file (referring to FIG. 2) which contains all the essential information regarding the location and content of the elements (graphics and text) comprising the fax (the process is detailed later). The computer system 30 then compresses the transmittal data file so that it can be more efficiently transmitted than ordinary data. The computer system, through a communications port (detailed later), transmits the compressed fax transmittal data file to the PDA device 40. The PDA device 40 decompresses the file and renders the fax image for display on its viewscreen 45.

Figure 2:
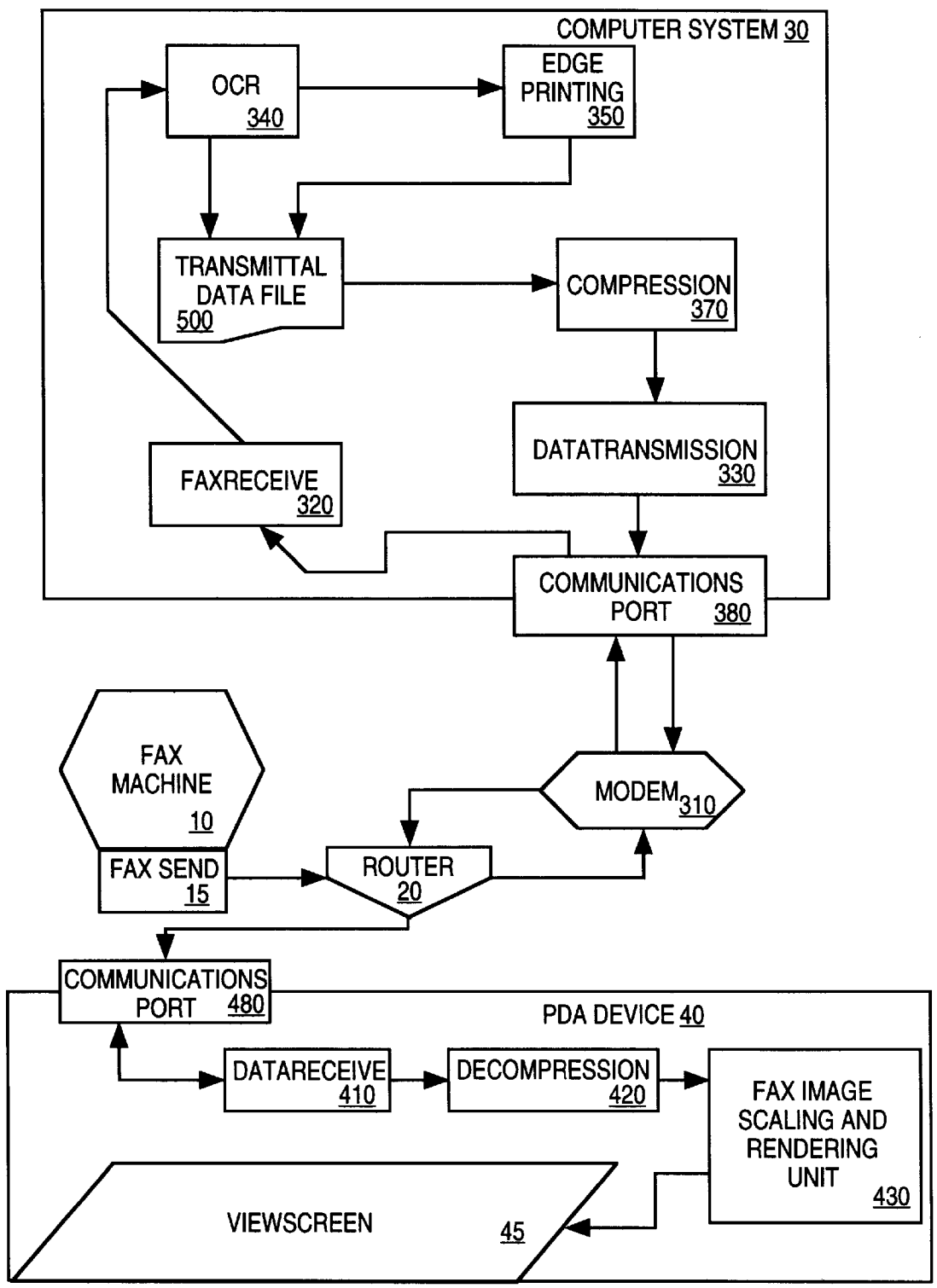
FIG. 2 is a detailed system diagram showing the process of adapting the fax for display on the viewscreen.

The components and software that handle and process the fax from source to destination is detailed in FIG. 2. The fax machine 10 has a fax send unit 15 which dials the phone number corresponding to the destination PDA device 40. This phone number is intercepted by the router 20. The router 20 can be described, when it is implemented as a PSTN or cellular switch as follows: 1) The router 20 that receives the phone number corresponding to the destination PDA device 40 recognizes that the incoming call is a fax and looks up a forwarding number corresponding to the phone number for calling the computer system's communication device shown as modem 310; and 2) the router 20 dials up the forwarding number and the incoming fax call is forwarded to the computer system through the modem 310 interfacing with the computer through communications port 380. The steps involved in such relaying and re-routing is well known in the art of communications and will not be discussed further.

The computer system has fax receive software 320 that can enable the computer system to correctly receive the incoming fax from modem 310 and interpret the incoming call as being a fax. The fax thus received is then processed by at least three distinct software functions—an optical character recognition software 340, an edge fitting scheme 350 and a compression scheme 370.

Referring still to FIG. 2, which shows a system level diagram of the present invention, block 340 is a custom optical character recognition software (OCR) which takes the fax and "scans" it for textual elements (recognizable text conforming to, for instance, the ASCII character set). Though OCR is well-known and commonly used in the art of scanning images (for example, OmniPage which is available from Caere Corporation) to extract text, the application of viewing a fax on a small device display screen requires modifying traditional OCR. Traditional OCR software places great emphasis on extracting as many, if not all, of the characters there are since the goal of traditional OCR scanning software is to get a version of the fax that is editable by word processing software. However, OCR 340 of the present invention only extracts text elements that are readily recognizable and have a high probability of being correct, leaving the remaining images to be broken down by edge-fitting block 350 since the ultimate goal is merely to display the fax on a viewscreen small in comparison to a standard computer monitor. By modifying the traditional OCR in this manner, OCR 340 operates at a lower error rate than a traditional OCR. One skilled in the art of OCR will be able to make such modifications to traditional software as are needed for the present invention.

Figure 5:
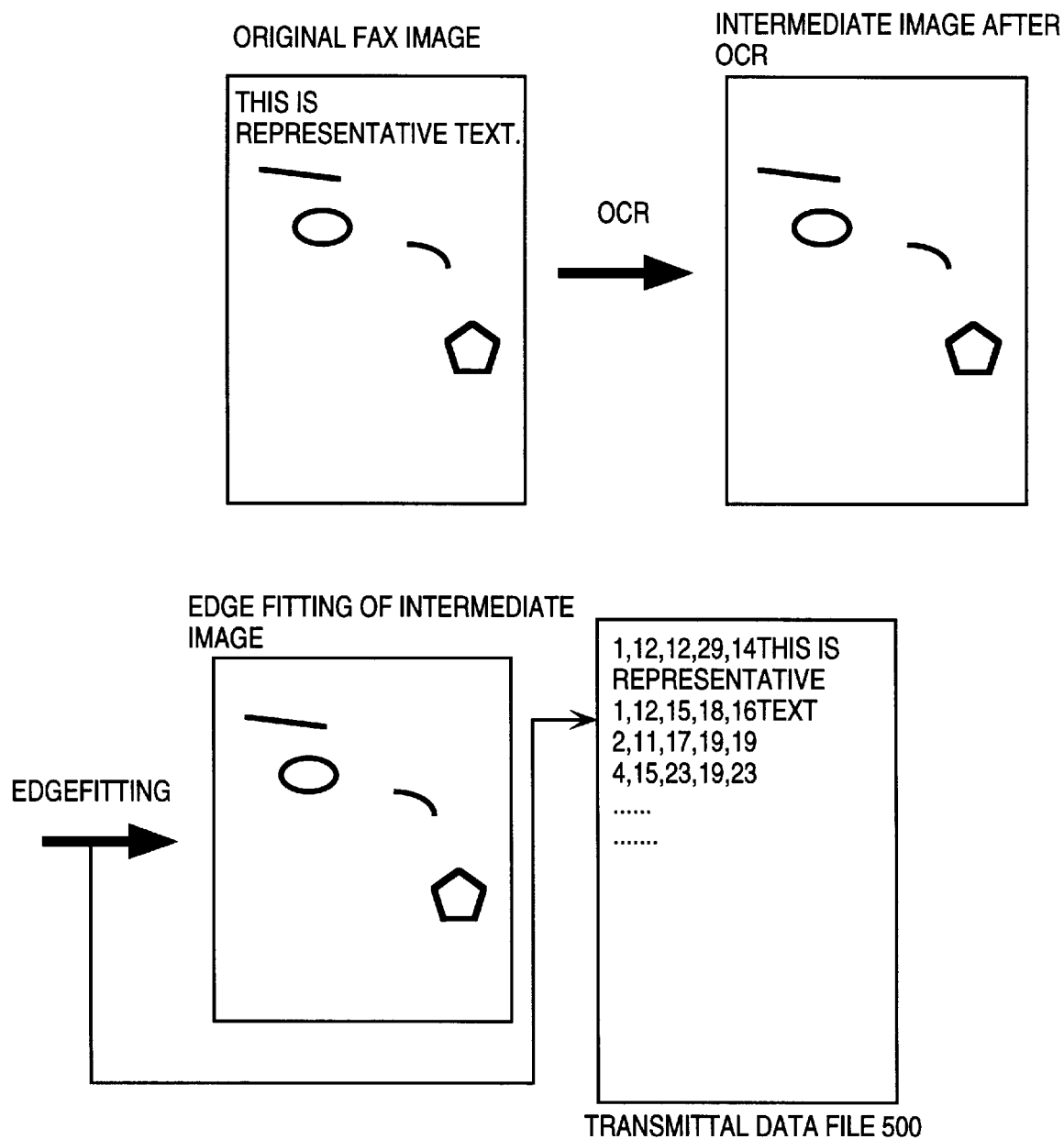
FIG. 5 is a pictorial representation of the stages of processing that the invention employs upon a fax.

The OCR 340 filters out recognizable ASCII text elements and assigns them coordinates (that define for instance a rectangular window) to fix their position relative to other elements on the fax page. The resulting text elements along with their coordinates are copied to a transmittal data file 500 which will ultimately be transferred to the PDA device 40. For instance, FIG. 5 shows the words "This is representative text" being assigned the window coordinates (12,12)–(29,14), (in the form (x,y) where x is the horizontal component and y the vertical component) and then being copied into the data transmittal file 500. The original fax is removed of the textual elements that have been recognized by the OCR which are then preserved in transmittal data file 500. Referring again to FIG. 5, the resulting intermediate version of the fax contains only images which the OCR 340 could not recognize as text. Additionally, the original fax in its entirety may also be preserved on the computer system 30 in a backup file for archiving as a fail-safe or for editing so that the original fax is not destroyed.

This intermediate version of the fax will be provided to the edge-fitting scheme 350 which can reduce the images, remaining after OCR 340 has filtered out text, as a composite of lines that edge fit to approximate the shapes of the images. The edge-fitting scheme 350 will convert the images remaining (after the OCR 340 has filtered out textual elements) into polygons and lines by edge-fitting. Edge-fitting is well known in the art of graphics compression and rendering and will not be described in detail. Edge-fitting commonly consists of converting curved lines into a series of straight lines. Advantageously, and unlike prior art edge-fitting, edge-fitting scheme 350 is optimized to provide a fewer number of linear approximations so that the interpolation is not as exact as would be required with a standard rendering for a full-size screen. Such edge fitting is illustrated in FIG. 5, where the images remaining after OCR are reduced to be represented by renderable coordinates.

For instance, FIG. 5 shows the curved line as being edge-fit into a series of two connected lines. The smaller the size of the viewscreen 45, the larger the resolution of the edge-fitting and the fewer the lines that need be computed. Detailed images are difficult to render on a small, low resolution screen such as would be found on a small device such as a PDA. Thus, there is no requirement that the number of edges (lines) be as great nor that the incremental distance of each line computed be as small as compared with edge-fitting for display on a standard size screen such as a 15" computer monitor. Edge-fitting scheme 350 operates under looser linear approximation than edge-fitting schemes of standard computer aided drafting software, as the target output of the present invention is also of lower resolution.

Additionally, edge-fitting scheme 350 can be equipped with polygon mesh utilities that reduce a closed shape into a series of connected lines that approximate the curvature of the closed shape. Thus, with a leading identifier type (identifying that the coordinates to follow as representing polygons rather isolated lines) and an unbroken series of coordinates, an entire polygon is preserved for rendering later at the destination. This is advantageous in that for a single line, two coordinates—a start and an end—need to be copied into the transmittal data file 500 and a series of such lines would double the number of coordinates copied. The number of coordinates copied to capture a polygon is therefore reduced by approximately half. Furthermore, the polygon mesh information, in addition to identifier type and coordinates, have a "fill" flag upon which the closed polygon is filled in upon its final rendering at the destination viewscreen. This "fill" flag prevents storing multiple lines that under pure edge-fitting are necessary to represent closed shapes that are shaded. A more detailed description of edge-fitting and polygonization may be found in James D. Foley, Andries van Dam, et al., *Computer Graphics, Principles and Practice,* Addison Wesley, (Reading, Mass. 1990) [hereinafter *Computer Graphics*] at pages 26–38 and 472–473.

Likewise, it may be advantageous to have circles represented by the edge-fitting scheme 350 by a center coordinate and a coordinate for a point of the circumference (or alternatively, a radius length) of the circle. FIG. 5 shows, for instance, a circle from the fax image copied to the data transmittal file 500 by giving the endpoint coordinates of a radial line of the circle. This prevents having to represent the circle by a large number of lines. A type identifier (identifying the coordinates following as those of a circle) and "fill" flag similar to the polygon mesh information can also be provided by the edge-fitting scheme 350 and copied along with the coordinates to the transmittal data file 500. FIG. 5 shows, for instance that the circle is given the type identifier of 4, whereas an ordinary line is given an identifier of 2.

The edge-fitting scheme 350 completes the sequence of breaking down the fax image into elements and corresponding coordinates (along with type information or fill flags) by copying the information into the transmittal data file 500 which also contains the textual elements (and window coordinates) obtained from the OCR software 340. The resulting data file thus constitutes all graphical and textual elements that were in the original fax and is used at the destination to scale and render the fax for display on the PDA viewscreen 45.

The transmittal data file 500, when completed with all the information necessary to reconstruct the fax, is then compressed by a compression technique 370 such as Pkzip (a product of PKWare, Inc.). Thus, the transmittal data file 500 is reduced to a very small size often 10 to 100 times smaller than the original fax size. The typical page of fax ranges approximately between 100K and 200K in size, and thus the final transmittal data file in compressed form is less than 1K (roughly the size of one page of ASCII text and numeric data). The compression technique 370 is well-known in the art, but will not work to compress a standard bitmap image file version of a fax such as a GIF (Graphics Interchange Format) or JPEG because these files are already in compressed form. Further, scaling a bitmap image such as a GIF requires computing power that a small device such as a PDA device does not have. But, the transmittal data file, containing only text, position information for the text and coordinates for lines and polygons, is easier to scale and render (as described) in terms of computing resources required than a bitmap image would be.

The compressed transmittal data file exits the compression program and is sent to the data transmission unit 330 for transmittal by the modem 310 via its interface with the communications port 380 of the computer system. The modem 310 dials the PDA device 40. The router 20 receives an identifier identifying the call as not a fax, but as a data file and prevents forwarding to the computer system 20 as previously done with the fax. Router 20 then seeks out the PDA device 40 and connects the call. The transmittal data file 500, in compressed form, is received by the PDA device 40 through its communications port 480 which then communicates the file to data receive unit 410 which interprets the transmission as a data file. As described earlier, the recipient may simply get a message indicating the number and size of faxes due to be sent by the computer, and may choose, as a command option, to store the fax for retrieval and whether it is stored or immediately transmitted, the recipient may also choose to send the fax to a real fax machine rather than the PDA.

A typical PDA device, such as Apple Computer Co.'s SIMON, must be modified to enable reconstruction of an image of the original fax using the transmittal data file 500. Thus, the PDA device 40 of the present invention will have suitable decompression software, such as Pkunzip, a product of PKWare, Inc.) either embedded within the phone or connected via a module, to decompress the transmittal data file 500. Further, unlike a typical PDA with a viewscreen and graphics engine, the PDA device 40 will have code to render lines and shapes by using coordinates provided them by the transmittal data file 500. The PDA device 40 also has the ability to convert ASCII codes into characters or directly output the text from the transmittal data file 500. The PDA device 40 has limited memory capability, much like other PDAs, but should also perform simple arithmetic (add, subtract, multiply and divide) for the purpose of scaling rendered images. Unlike the computer system 30, therefore, the PDA device 40 may have only the limited ability to translate coordinates, draw lines, draw text and scale the images on the viewscreen 45. These capabilities of the PDA device 40 are discussed below in greater detail.

The data receive unit 410 provides the compressed file to decompression scheme 420. The data file is then decompressed by a decompression scheme 420, using Pkunzip (if Pkzip were used at the computer system compression stage) for instance, so that the text elements, position information for the text and coordinates for lines and polygons can be made available to a fax image scaling and rendering unit 430.

The fax image scaling and rendering unit 430 temporarily places into memory the text elements, line by line, or word by word using their ASCII codes and then scales down the line or word of text by reducing the font size of the text (determined by calculating the size of the text window coordinates supplied). By scaling the text information on a line by line basis, the relative position of the text lines is preserved to give the rendered image the same look-and-feel as the original. Optimally, to achieve scaling, a ratio is calculated that is equal to the quotient of the fax page size to the size of viewscreen 45. Of course, if it is desired to have a fax that can be scrolled, the ratio can be calculated using some increment of the actual size of the viewscreen 45. The reduced font size can be implemented either through scalable fonts (like TrueType fonts) which can handle any reduction ratio or by fonts that are limited to predetermined sizes. Using fonts limited to predetermined sizes, the ratio will be used to divide the original font size down and then the closest font size available will be used to render the text. The fax image scaling and rendering unit 430 then translates the coordinates provided by the transmittal file (representing a window) that correspond to the text element to coordinates suitable for the viewscreen 45. The text is then output on the viewscreen at the coordinates provided (representing a window). In this manner, all the text elements are output to the viewscreen 45.

The transmittal data file 500, when decompressed, will also contain line and polygon information which is provided to the fax scaling and rendering unit 430. The scaling and rendering unit 430 translates (maps) the coordinates provided from the transmittal data file 500 to be fit the viewscreen 45 using, for example, the ratio calculated for font reduction. In doing so, unit 430 has also automatically scaled the lines and polygons to fit the viewscreen since the coordinate system of the viewscreen upon which the fax coordinates are mapped covers the viewscreen edge-to-edge. Then, the unit 430 renders the lines and polygons to be drawn on the viewscreen 45.

The coordinate translation of the polygons and lines and the font reduction of the text elements all require only simple arithmetic and thus can easily be performed with the limited processor capability of the PDA device 40 (in comparison to the computer system 30). The complicated process of pixel-by-pixel bitmap image compression, rendering, and scaling (to fit the small viewscreen) is therefore bypassed and the result is an easily scalable and quickly viewable screen image of the fax. Scaling a bitmap image requires linear edge-fitting of all pixels on an enormous level and cannot be performed by such devices as a PDA. Though, the present invention also uses a form of linear edge-fitting, it does so on a larger computer with the necessary processor, memory and storage capability to carry out edge-fitting. Further, since the present invention breaks down the image into a series of pre-defined lines and objects, the PDA device 40 can easily display and scale these objects and lines and reconstitute the image.

In addition, it may be advantageous to have a zooming function on the PDA device 40 so that the recipient user can enlarge an area of the fax image as displayed on the viewscreen. Such a zoom feature is implemented by merely mapping the coordinates of the lines and polygons desired to be zoomed onto the entire viewscreen 45. Again, such an operation is simple arithmetic and not as compute intensive as scaling an ordinary bitmap image which must decide which pixels to keep and which to fill in. The text elements contained within the zoom area coordinates are scaled by adjusting their font size up/down to a size in proportion with the coordinate mapping ratio used to zoom the lines and polygons.

Figure 3:
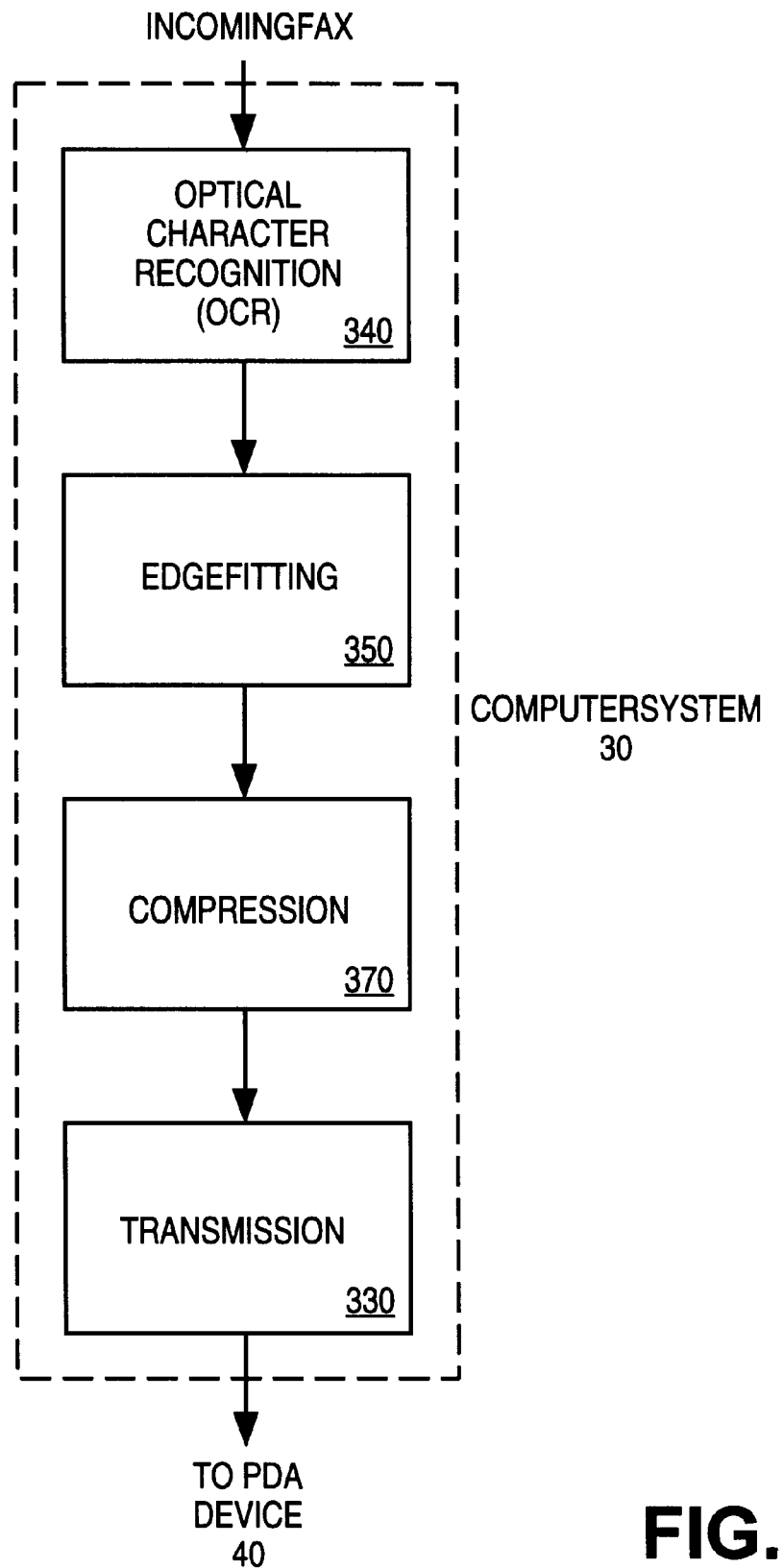
FIG. 3 is a block diagram showing the fax image processing components on the computer system.

FIG. 3 is a simple block diagram of the components and schemes of the computer system 30 that process the fax and transmit it to the PDA device 40. Referring also to FIG. 5, the incoming fax runs through an OCR 340, the result of which are two files—one, the transmittal data file containing ASCII text and position information and the other, the filtered out file containing left over graphical images that the OCR 340 did not recognize. The filtered out file is then fed to the edge-fitting scheme 350 which edge fits the images into polygons and lines. The coordinates of the lines and polygons (and other pertinent information) are stored in the transmittal data file. The transmittal data file, once complete, is then compressed by a compression scheme 370. The compressed transmittal data file is then transmitted by a data transmission unit 330 of computer system 30 to PDA device 40 for displaying.

Figure 4:
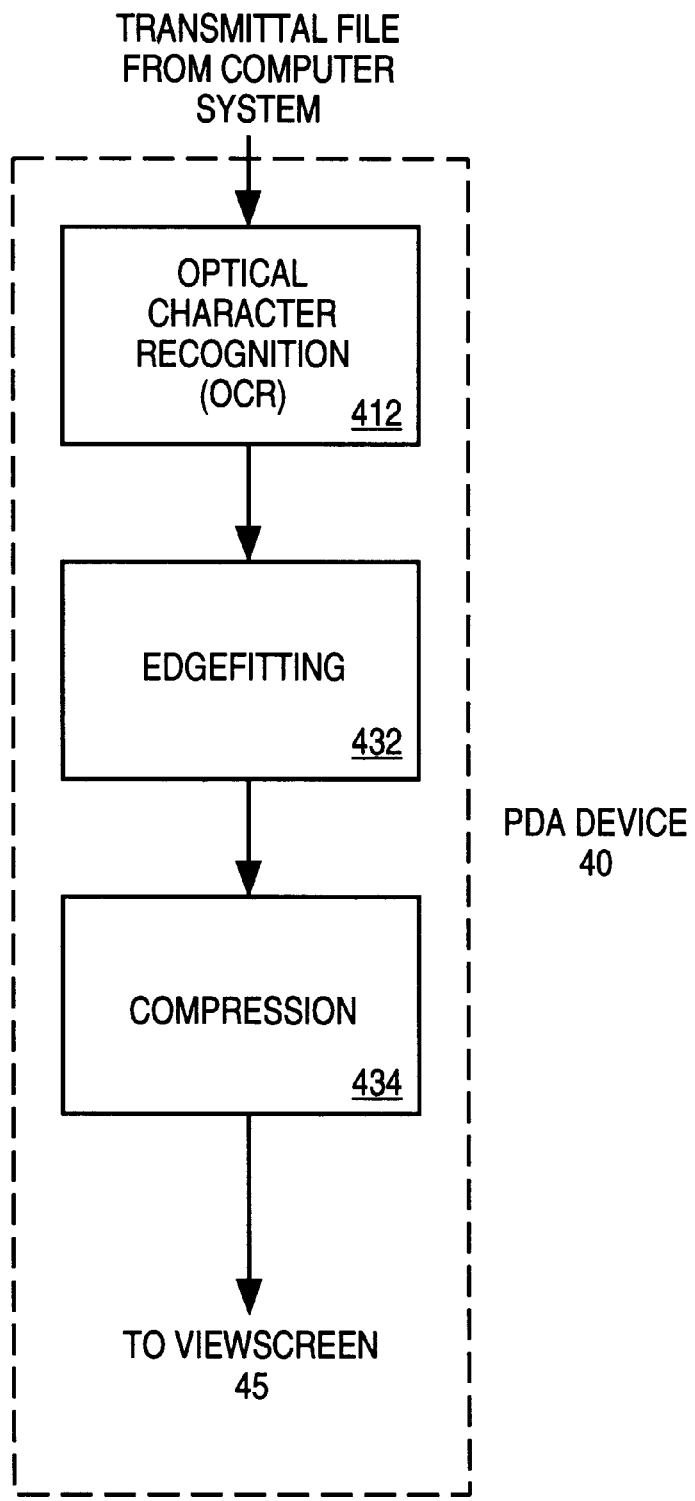
FIG. 4 is a block diagram showing the fax image displaying components on the Personal Digital Assistant device.

FIG. 4 is a simplified block diagram of the components and schemes of PDA device 40 that displays the fax onto the viewscreen. The data transmittal file is received and then decompressed to its original form by the decompression block 420. The text information of the transmittal file, i.e., text and corresponding position information, are provided to the fax scaling block 432. The fax scaling block 432 maps the coordinates provided in a proportion roughly corresponding to the ratio of the original scanned image size of the fax to the viewscreen coordinates. The scaling block 432 also reduces the font size of the text elements corresponding to this ratio. Either in parallel or in a pipeline manner, the text, lines and polygons are then displayed, either simultaneously or instantaneously upon completion of scaling, on the viewscreen 45 by the rendering block 434. An example of a scaling algorithm commonly employed is found in *Computer Graphics* at pages 202–204.

FIG. 5 illustrates sample images of fax at various stages of processing. A fax image is shown with various different elements, text, a straight line, a circle, a curved line and a shape with 5 sides. The text "[t]his is representative text" is filtered out by the OCR software. The software also provides the coordinates of a window where the text is located, e.g. (12,12)–(29,14). The transmittal data file receives the coordinates along with an identifier type of "1" which indicates that the coordinates to follow are a rectangular text window where the text is to be located. The text is then copied into the transmittal file after the coordinates. Of course one skilled in the art will recognize that the pictorial is only illustrative, as the text is likely represented by a sequence of ASCII codes. After the OCR, the file remaining will contain images that were not recognized as text by the OCR. The straight line is converted into coordinates (11,17)–(19,19) and also has a leading type identifier of "2" indicating that it is a line. The curved line is converted into two straight lines and are represented in the data transmittal file as two lines. The circle is represented by the edge-fitting software by the coordinates of a radial line, with a leading type identifier of "4".

Not shown in the FIG. 5 representation of the transmittal data file, the polygon is likewise split into a stream of connecting coordinates instead of lines since they are inherently connected. A leading identifier type different from those used for circles, lines or text is also provided leading the coordinate stream. Also not shown is an option fill flag that may be provided with the circle and polygon to indicate that it should be filled in solid upon rendering. One skilled in the art, will readily understand that a number representing color can also be transmitted along with the other text and graphics information such that the rendering at the viewscreen can be achieved in color as well as black-and-white.

Though the present invention has been described as operating with a PDA, the method is equally applicable to any viewscreen on a device requiring limited processor and memory capability, such as a PDA, in comparison to a computer system.

As an alternate embodiment, the scaling that occurs on the PDA device 40 can be achieved at the computer system 30. The computer system 30 may have a look-up file identifying the type of PDA device and size of its viewscreen to which the fax will be sent. Such a look-up file may contain, in case the computer system 30 is utilized to process different faxes for different recipients at different times, the phone-number of the destination device as a key. Matching this key, the computer system 30 can determine the parameters of the PDA device and viewscreen, by hwich it can convert the coordinates into a form and size utilized by the PDA device

40. Thus, the PDA device need not even perform the arithmetic scaling and may display the image directly using the coordinates resident in the transmittal data file 500.

What is claimed is:

1. A method comprising the steps of:

intercepting at a router a facsimile transmission destined for a personal digital assistant (PDA);

routing said facsimile transmission to a computer system, said computer system having more processing power than said PDA;

compressing on said computer system said facsimile transmission into a transmittal data file representing an approximation of the image of said facsimile transmission;

transmitting said transmittal data file to said router, said router recognizing said transmittal data file is not a facsimile transmission and said router routing said transmittal data file from said computer system to said PDA; and displaying onto a view screen of said PDA said approximation of the image of said facsimile transmission.

2. A method according to claim 1 wherein said transmittal data file comprises rendering information for displaying a set of objects and contains therein defining, positioning and scaling information.

3. A method according claim 2 wherein the step of displaying includes the step of rendering the set of objects into graphical and textual elements.

4. A method according to claim 3 wherein the graphical elements includes lines and polygons.

5. A method according to claim 3 wherein the step of displaying includes the steps of positioning and scaling the rendered graphical and textual elements to fit on the viewscreen of said portable data processing device.

6. A method according to claim 1 wherein the step of compressing the facsimile transmission comprises the steps of:

utilizing an optical character recognition algorithm to filter out recognizable text from the facsimile transmission; and utilizing an edge-fitting algorithm linearly fitting any images of the facsimile transmission that have not been filtered out by the optical character recognition algorithm.

7. A method according to claim 1 further comprising the step of storing the transmittal data file and the facsimile transmission on the computer system for later use.

8. A method according to claim 1 wherein the step of compressing the facsimile transmission on said computer system includes scaling the set of rendering information, using said computer system, to fit on the viewscreen of said portable data processing device.

9. The method according to claim 1 wherein said steps of intercepting and routing include the steps of:

intercepting the incoming facsimile transmission at a router;

forwarding the incoming facsimile transmission to said computer system using said router; and receiving the facsimile transmission at a communications port of said computer system.

10. A system comprising:

routing system adapted to forward a facsimile transmission destined for a personal digital assistant (PDA);

computer system adapted to receive said forwarded facsimile transmission destined for a personal digital assistant (PDA) and for decomposing the facsimile transmission into a transmittal data file containing a set of rendering information, said computer system adapted to transmit the transmittal data file to said PDA through said routing system, said routing system adapted to recognize that said transmittal data file is not a facsimile transmission, PDA having less computing capability than said computer system; and reconstruction software executed within said PDA adapted to display an approximation of said facsimile transmission on a viewscreen of said PDA, said approximation generated from said set of rendering information contained in said transmittal data file.

11. A system according to claim 10 further comprising a communications port.

12. A system according to claim 10 further comprising a router.

13. A system according to claim 10 wherein said computer system is at a remote location from said PDA.

14. A system according to claim 10 wherein said computer system stores the facsimile transmission and transmittal data file for later use.

15. A system according to claim 12 wherein said router is coupled to a public switched telephone network for accessing a phone number corresponding to said computer system and then routing the facsimile transmission to said computer system.

* * * * *